US012066346B2

(12) United States Patent
Chiarella et al.

(10) Patent No.: US 12,066,346 B2
(45) Date of Patent: Aug. 20, 2024

(54) DETECTING IMPACTS ON METAL TARGETS IN A LIVE-FIRE ENVIRONMENT

(71) Applicant: Level Up Live, LLC, Midway, UT (US)

(72) Inventors: Thomas Chiarella, Sammamish, WA (US); Tyler H. Harris, Midway, UT (US)

(73) Assignee: Level Up Live, LLC, Midway, UT (US)

( * ) Notice: Subject to any disclaimer, the term of this patent is extended or adjusted under 35 U.S.C. 154(b) by 266 days.

(21) Appl. No.: 17/752,188

(22) Filed: May 24, 2022

(65) Prior Publication Data

US 2022/0390304 A1    Dec. 8, 2022

Related U.S. Application Data

(60) Provisional application No. 63/343,317, filed on May 18, 2022, provisional application No. 63/192,233, filed on May 24, 2021.

(51) Int. Cl.
*G01L 5/14*  (2006.01)
*G01L 1/22*  (2006.01)

(52) U.S. Cl.
CPC ................. *G01L 5/14* (2013.01); *G01L 1/22* (2013.01)

(58) Field of Classification Search
CPC .............. G01L 5/14; G01L 1/22; G01L 1/205
See application file for complete search history.

(56) References Cited

U.S. PATENT DOCUMENTS

| | | | | |
|---|---|---|---|---|
| 4,379,405 A | * | 4/1983 | Engeler | G01L 5/14 89/14.05 |
| 4,883,271 A | * | 11/1989 | French | A63B 69/305 482/84 |
| 5,349,853 A | * | 9/1994 | Oehler | G01S 5/22 702/140 |
| 7,278,290 B1 | * | 10/2007 | Hughes | C09K 9/00 73/1.37 |
| 2015/0276349 A1 | * | 10/2015 | Northrup | F41G 3/26 434/22 |
| 2016/0169608 A1 | * | 6/2016 | Schulz | F41A 33/02 434/22 |
| 2019/0390932 A1 | * | 12/2019 | Schulz | F41A 33/02 |
| 2022/0016508 A1 | * | 1/2022 | Baer | A63B 71/0622 |

* cited by examiner

*Primary Examiner* — David J Bolduc
(74) *Attorney, Agent, or Firm* — Dodd Law Group; Michael B. Dodd (57) ABSTRACT

Examples extend to methods, systems, apparatus, and computer program products for detecting impacts on metal targets in a live-fire environment. In one aspect, a system determines and displays a bullet impact on a steel target. The system includes a plurality of sensors conjoined with said steel target and including at least one strain gauge for measuring data including strain on a target. A set of LED lights is conjoined with said steel target for displaying bullet impacts. The system includes a wireless transmitter adapted to transmit target impact data. The wireless transmitter is conjoined with or otherwise communicably connected to the plurality of sensors. The system includes at least one remotely located wireless receiver for receiving transmitted target impact data.

11 Claims, 10 Drawing Sheets

$$u(x,t) = \begin{pmatrix} u_1(x,t) \\ u_2(x,t) \\ u_3(x,t) \end{pmatrix}$$

$$\sigma_{ij} = \underline{\underline{\sigma}} = \begin{pmatrix} \sigma_{11} & \sigma_{12} & \sigma_{13} \\ \sigma_{21} & \sigma_{22} & \sigma_{23} \\ \sigma_{31} & \sigma_{32} & \sigma_{33} \end{pmatrix}$$

$$\underline{e} = \frac{1}{2}(\nabla u + (\nabla u)^T)$$

$$\{\sigma_{12}(x + dx_1\hat{n}_1) - \sigma_{12}(x)\}\, dx_2 dx_3$$
$$+\{\sigma_{22}(x + dx_2\hat{n}_2) - \sigma_{22}(x)\}dx_1 dx_3$$
$$+\{\sigma_{32}(x + dx_3\hat{n}_3) - \sigma_{32}(x)\}dx_1 dx_2$$
$$+f_2 dV = \rho \frac{\partial^2 u_2}{\partial t^2} dV$$

$$\sigma_{ij} = C_{ijkl} e_{kl}$$
$$\underline{\sigma} = \underline{\underline{C}}\, \underline{e}$$

$$E_Q = \frac{E_P \cot(\beta) + E_O \cot(\alpha) - N_P + N_O}{\cot(\beta) + \cot(\alpha)}$$

$$N_Q = \frac{N_P \cot(\alpha) + N_O \cot(\beta) - E_P + E_O}{\cot(\beta) + \cot(\alpha)}$$

DETECTING IMPACTS ON METAL TARGETS IN A LIVE-FIRE ENVIRONMENT

CROSS-REFERENCE TO RELATED APPLICATIONS

This application claims the benefit of U.S. Provisional Patent Application Ser. No. 63/192,233, entitled "Real-Time, Closed-Loop Feedback, Timing, Scoring, and Gamification Of Shooting", filed May 24, 2021, which is incorporated herein in its entirety. This application claims the benefit of U.S. Provisional Patent Application Ser. No. 63/343,317, entitled "Actuating Metal Shooting Targets", filed May 18, 2022, which is incorporated herein in its entirety.

BACKGROUND

1. Technical Field

Aspects of the invention generally relate to increasing the intelligence and network connectedness of shooting targets using transducers, sensors, signal processing, and embedded electronics.

2. Background and Relevant Art

Shooting at a gun range typically involves placing a target at a distance from the shooter, and the shooter proceeds to attempt to hit the target with bullets. This process is similar at all gun ranges, whether for recreational or competitive shooters at a commercial gun range, or law enforcement or military personnel at a training facility.

The vast majority of targets used for range shooting are some form of paper medium, such as construction paper or cardboard. These targets have a wide variety of printed graphics including the traditional circular bullseye, human silhouettes, grids, animals, aliens, zombies, and so forth. Regardless of the printed graphics, all of these targets register "hits" in the form of bullet holes in the medium itself. Some paper targets feature two layers paper; a sub layer that has a brightly colored ink, and the top layer that has a printed targets graphics. Hits on this type of paper target results in the bullet holes highlighted by the brightly colored ink, thereby aiding visibility by the shooter or a scoring official.

Regardless of the type of paper target, hits are determined by detecting bullet holes in the medium. The single major benefit of paper targets is its ability to record the precise location of hits relative to an aim point, such as the bullseye. After a shooting session, a paper target can be retrieved and analyzed for accuracy, such as the diameter of a group of hits.

The drawbacks of paper targets include the difficulty of determining the location of a hit—or a miss—on a target that already has numerous bullet holes, the lack of any ability to perform automated scoring or data collection, the lack of any reactive or interactive mechanisms (for example, a hit causes the target to fall over), and the need to retrieve the paper target to perform manual scoring.

Steel targets, usually shapes such as circles, squares and hexagons of varying dimensions address some of the limitations of paper targets. Steel targets provide immediate feedback of a "hit" with a distinctive ping and some steel targets are reactive in that they swing, fall over or otherwise move in response to the bullet impact.

The drawbacks of steel targets include the inability to determine the location of a hit, so any type of hit clustering or shot group sizing is not possible. Unlike paper, there is no record of a shooting session that can be post-analyzed. While paper targets work with any type of firearm from air gun to high-powered military firearms, reactive steel targets only work with higher-powered firearms that deliver enough energy in the bullet to actuate the target (e.g., knock it over). Furthermore, in a setting where multiple shooters are simultaneously shooting at steel targets, it becomes essentially impossible to determine which ping is associated with which shooter, thereby defeating the purpose of a target altogether, which is to register hits.

There are other types of targets that attempt to overcome the limitations of current target technology, such as the use of a mesh or membrane behind a paper target to provide a form of electronic scoring. The limitations with these types of systems is that the mesh or membrane must be replaced after a modest number of hits, just like a paper target.

BRIEF SUMMARY

Examples extend to methods, systems, apparatus, and computer program products for detecting impacts on metal targets in a live-fire environment.

In one aspect, a system determines and displays a bullet impact on a steel target. The system includes a plurality of sensors conjoined with said steel target and including at least one strain gauge for measuring data including strain on a target. A set of LED lights is conjoined with said steel target for displaying bullet impacts. The system includes a wireless transmitter adapted to transmit target impact data. The wireless transmitter is conjoined with or otherwise communicably connected to the plurality of sensors. The system includes at least one remotely located wireless receiver for receiving transmitted target impact data.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, apparatus, and computer program products for detecting impacts on metal targets in a live-fire environment.

Aspects of the invention include a system for: (a) the detection of a bullet impact on a target composed of any steel alloy, including armor plate steel alloys such as AR500 and AR600, (b) the determination of the specific location and power factor of the bullet impact on the steel target, (c) essentially immediate visual feedback of impact data, and (d) the transmission of that data to a remotely located receiver. A wireless transmitter is communicably connected to the steel target and associated impact detection apparatus. The impact detection apparatus can utilize the communication connection to transmit impact, power and location data to a receiver. The receiver is communicably connected to devices and systems for the processing, storage, correlation and display of the target impact, location and power data, as well as actuating other targets and sequences of targets, lighting and special effects associated with the training with firearms, marksmanship, and shooting sports timing and scoring.

Aspects of the invention facilitate automated, precision steel target impact detection (which may be referred to as "Smart Steel") based on principles of wave mechanics and particle motion theory. When an impact occurs on a solid object, such as the impact of a bullet on a steel plate, a compressive stress wave travels through the steel at a speed (c), which is a function of the elastic modulus (E) and mass density (M) of the material. The impact induces a force (F) and a particle velocity (v) at the point of impact.

To sense and measure these compressive stress waves, one or more transducers can be placed into the steel. The transducers can include one or more strain gauges (e.g., electrical resistance-type strain gauges), which measure compressive and tensile force, and one or more accelerometers (e.g., MEMS, charge-coupled type accelerometers), which measure corresponding particle motion. In one aspect, a strain gauge and an accelerometer are combined to form a transducer pair. Transducer pairs, possibly along with other sensor types, can be integrated as a "sensor points". Multiple transducer pairs and/or sensor points can be joined to a steel target at selected locations.

The physics of the wave mechanics involved in steel plates, as well as other types of materials and structures, is similar to the physics of electrical current traveling down a conductor or light waves propagating through a wave guide (optic fiber). Whether a mechanical wave, an electron, or a photon, anytime a material or surface discontinuity is encountered, a portion of the incident energy is absorbed, another portion is reflected or refracted, and the remaining portion is transmitted. The degrees of absorption, reflection, refraction, and transmission can be determined by dissimilarities encountered at the boundaries, such as where a steel target attaches to a mounting service, as well its edges.

Resistance forces along the surfaces of a steel plate can cause wave reflections that travel in essentially the opposite direction of the original shock wave. Surfaces of a steel plate can include edges of the steel plate that do not contact other materials (besides open air) as well as points where the steel plate does contact other materials, such as, a mounting bracket. Times at which an original shockwave and corresponding reflections arrive at different transducer pairs and/or sensor points can be used to detect an impact location on a steel target.

System Architecture

Figure 1A:
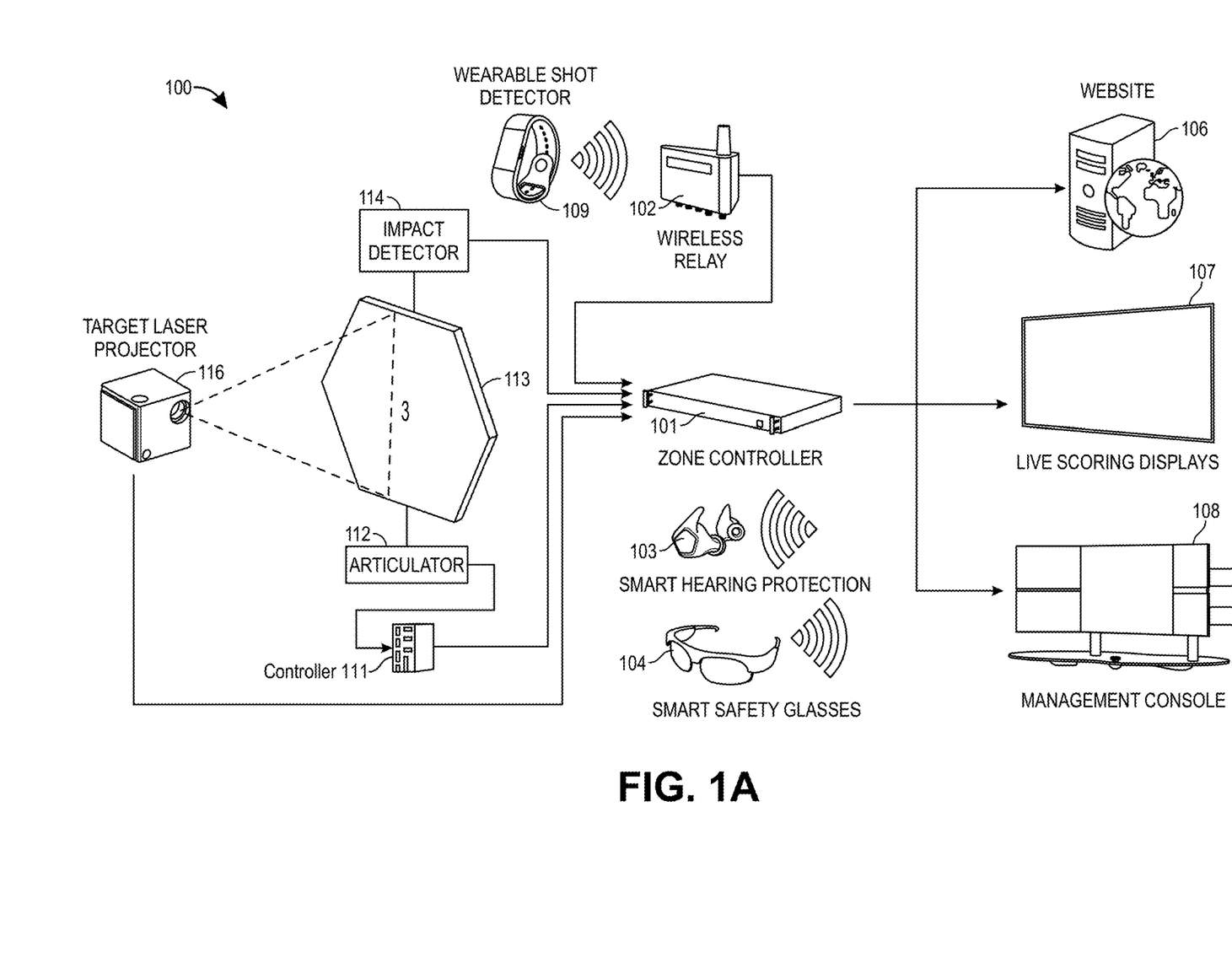
FIG. 1A depicts an example architecture of a real-time closed loop shooting system.

In one aspect, one or more steel targets are included in a real-time closed loop shooting system. FIG. 1 depicts an example architecture 100 of a real-time closed loop shooting system. As depicted, architecture 100 includes zone controller 101, wireless relay 102, smart hearing protection 103, smart safety glasses 104, wearable shot detector 109, website 106, live scoring displays 107, management console 108, controller 111, articulator 112, steel target 113, impact detector 114, and target laser projector 116. The components of computer architecture 100 can be connected to one another via pneumatic connections, electrical connections, wireless networks, wired networks, etc. The depicted components can also be connected to other components (not shown), such as, a compressed air source.

In general, management console 108 can be used to configure various shooting scenarios that are then implemented by zone controller 101. Wireless relay 102 can facilitate wireless communication between zone controller 101 and smart hearing protection 103, smart safety glasses 104, and wearable shot detector 109. During a shooting scenario, such as, a competition between shooters, scores of individual shooters, target impacts, shooter data, etc. can be displayed at live shooing scores 107. Scores and other data about a shooting scenario can also be output to website 106.

During a shooting scenario, zone controller 101 can send instructions (or a sequence of instructions) to controller 111. In accordance with the instructions controller 111 can control articulator 112, for example, causing steel target 113 to be presented (e.g., raised, rotated, etc.) to a shooter. In one aspect, target laser projector 116 projects data, for example, a number (e.g., the number '3'), a letter, a symbol, a word, bullseye, grid, etc. on to steel target 113.

A shooter can identify steel target 113 based on the projected data. The shooter may discharge a firearm shooting a bullet at steel target 113. Impact detector 114 can detect if/when a bullet impacts steel target 113. Impact detector 114 can implement impact detection using various different levels of sophistication.

In one aspect, impact detector 114 detects that a bullet impacts steel target 113 in some location (e.g., steel target 113 was knocked down) but does not determine where the impact occurred on steel target 113. Impact detector 114 can indicate the bullet impact to zone controller 101. Zone controller 101 can in turn indicate the bullet impact back to a shooter via one or more of: smart hearing protection 103 (e.g., an audio sound or verbal message), smart safety glasses 104 (e.g., a visual indication on an embedded screen), or wearable shot detector 109 (e.g., a vibration). Zone controller 101 can also update live scoring displays 107 to indicate the bullet impact, update a score, etc. Similar information can also be reflected at website 106 and/or management console 108.

In another aspect, impact detector 114 detects the location of an impact on steel target 113. One or more transducer pairs and/or sensor points can be joined to steel target 113 at various locations. For example, transducer pairs and/or sensor points can be mounted to a face of steel target 113 that is generally not exposed to a shooter (e.g., the "back side"

of steel target 113). In one aspect, three transducer pairs (each including a strain gauge and accelerometer) are disposed on steel target 113 at a specified spacing from one another.

Transducer pairs and/or sensor points can also be covered with bullet resistant material. Thus, any transducer pairs and/or sensor points are protected from direct bullet impacts, ricochets off other structures (e.g., other targets, a range back stop, etc.), and spall (bullet fragments) from nearby impacts (e.g., to targets or other structures). The transducer pairs and/or sensor points measure impact data and send impact data to impact detector 114, including upon bullet impact. Impact detector 114 can process the impact data to derive a bullet impact location on steel target 113.

In one aspect, steel target 113 includes a wireless receiver. Zone controller 101 or other processing system can send a trigger signal to the wireless receiver. Transducer pairs and/or sensor points can be activated and start measuring impact data in response to receiving the trigger signal.

Impact detector 114 can indicate the bullet impact location to zone controller 101. Zone controller 101 can in turn indicate the bullet impact location back to a shooter via one or more of: smart hearing protection 103 (e.g., an audio sound or verbal message), smart safety glasses 104 (e.g., a visual indication on an embedded screen), or wearable shot detector 109 (e.g., a vibration). Zone controller 101 can also update live scoring displays 107 to indicate the bullet impact location, update a score, etc. For example, an image of steel target 113 can be displayed with a visual indication of the bullet impact location (e.g., at smart safety glasses 104 or live scoring displays 107). Similar information can also be reflected at website 106 and/or management console 108.

In one aspect, multiple sets of controllers 111, articulators 112, steel target 113, and impact detectors 114 are deployed. For example, architecture 100 (or at least potions thereof) are implemented at a gun range or other shooting facility. The gun range or other shooting facility can include multiple shooting lanes enabling multiple shooters to practice, compete, etc. at the same time. Each shooting lane can include one or more steel targets 113 with corresponding controllers 111, articulators 112, and impact detectors 114. It may be that be that a single controller 111 controls articulators 112 for a plurality of different steel targets 113. Similarly, an impact detector 114 may detect bullet impacts and/or bullet impact locations for a plurality of different steel targets 113. Controller 111 and/or impact detector 114 may act as a multiplexer and/or de-multiplexer combining and/or separating data as appropriate.

In general, impacts and/or impact locations can be detected in essentially real-time across a plurality of steel targets. As impacts and/or impact locations are detected, impact detector(s) 114 can send indications of the impacts and/or impact locations to zone controller 101. Zone controller 101 can relay indications of impacts and/or impact locations to appropriate devices. For example, zone controller 101 can indicate all impacts and/or impact locations at live scoring displays 107. Zone controller 101 can also match impacts and/or impact locations to specific shooters and relay indications of impacts and/or impact locations to corresponding devices being worn by specific shooters respectively.

In one aspect, steel target 113 is referred to as a "popper" or "hopper" target. Articulator 112 uses an articulating mechanism (e.g., pneumatic) to "pop up" steel target 113 for presentation to a shooter. Upon bullet impact, steel target 113 is knocked into a "down" position.

The geometric shape of steel target 113 can be varied including circular targets, square targets, cylindrical targets, etc.

Impact detector 114 (or even steel target 113 itself) can also wirelessly transmit information used to identify the type, size, shape, number of LED elements, articulating capabilities (raise, lower, conduct other movements, etc.), or other capabilities of steel target 113.

Figure 1B:
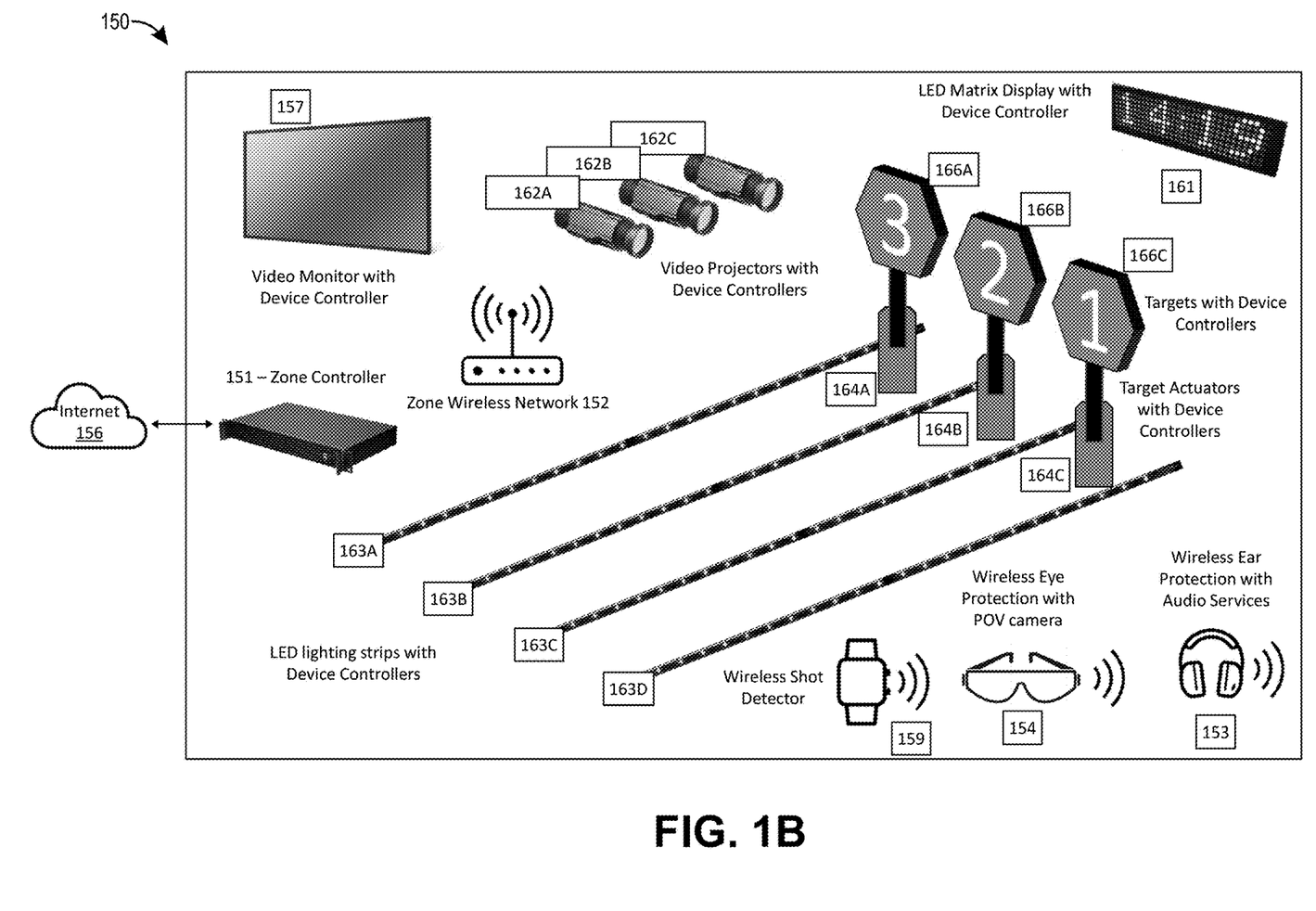
FIG. 1B depicts an example architecture of a smart gun range shooting bay with network connected equipment.

In one aspect, a shooting bay is network connected. FIG. 1B depicts an example architecture 150 of a smart gun range shooting bay with network connected equipment. As depicted, architecture 150 includes zone controller 151, zone wireless network 152, wireless ear protection 153, wireless eye protection 154, video monitor 157, wireless shot detector 159, LED matrix display 161, video projectors 162A, 162B, and 162C, LED lighting strips 163A, 163B, 163C, and 163D, target actuators 164A, 164B, and 164C, targets 166A, 166B, and 166C.

Each of targets 166A, 166B, and 166C can be a steel target with one or more joined transducer pairs and/or sensor points including strain gauges and accelerometers. The strain gauges and accelerometers can be used to sense wave absorption, wave reflection, wave refraction, and wave transmission corresponding to a bullet impact on the steel target.

Each of video monitor 157, wireless shot detector 159, LED matrix display 161, video projectors 162A, 162B, and 162C, LED lighting strips 163A, 163B, 163C, and 163D, target actuators 164A, 164B, and 164C, targets 166A, 166B, and 166C include device controllers. The device controllers can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory. The device controllers can also comprise a network interface module (e.g., a "NIC") facilitating wired and/or wireless communication via zone wireless network 152.

Zone controller 151 is connected to internet 156. The components of computer architecture 150 can be connected to one another via pneumatic connections, electrical connections, wireless networks, wired networks, etc. The depicted components can also be connected to other components (not shown), such as, a compressed air source.

In general, zone controller 151 can implement various shooting scenarios at the smart gun range shooting bay. Zone wireless network 152 can facilitate wireless communication between zone controller 151, smart hearing protection 153, smart safety glasses 154, wearable shot detector 159, and devices controllers of other depicted components. During a shooting scenario at the smart gun range shooting bay, such as, a competition between shooters, scores of individual shooters, target impacts, shooter data, etc. can be displayed video monitor 157. Scores and other data about a shooting scenario can also be output to Internet 156.

In general, zone controller 151 can send instructions (or a sequence of instructions) to controllers at one or more of targets 166A, 166B, 166C and/or one or more of target actuators 164A, 164B, 164C to present different shooting scenarios, sequences, timings, etc. In accordance with the instructions, target actuators 164A, 164B, 164C can actuate targets 166A, 166B, 166C to implement the different shooting scenarios, sequences, timings, etc. For example, different targets can be raised at different times and/or be presented with LEDs set to different colors. Video projectors 162A, 162B, 162C can project data, for example, a number (e.g., the number '1', '2' or '3'), a letter, a symbol, a word, bullseye, grid, etc. onto targets 166A, 166B, 166C respectively. As part of a shooting scenario, sequence, timing, etc. different data can be presented on different targets at different times. Data projected onto an individual target can also be varied over time.

Zone controller 151 can control LED lighting strips 163A, 163B, 163C, and 163D to indicate approaches to targets 164A, 164B, and 164C. The colors and patterns presented at LED lighting strips 163A, 163B, 163C, and 163D can be varied as part of a shooting scenario, sequence, timing, etc.

Zone controller 151 can control LED matrix display 161 to display information to a shooter at the smart gun range shooting bay, such as, a time remaining in a shooting scenario, sequence, timing, etc.

Zone controller 151 can indicate bullet impacts back to a shooter via one or more of: wireless ear protection 153 (e.g., an audio sound or verbal message), wireless eye protection 154 (e.g., a visual indication on an embedded screen), or wearable shot detector 109 (e.g., a vibration).

Accordingly, in general, zone controller 151 can manage and orchestrate other components of architecture 150 to provide dynamic shooting skills, drills and games that feature actuating targets, lighting, special effects, and informational signage.

Detecting Impact Characteristics

Aspects of the invention include a steel target (e.g., steel target 113) with one or more joined transducer pairs and/or sensor points including strain gauges and accelerometers. The strain gauges and accelerometers can be used to sense wave absorption, wave reflection, wave refraction, and wave transmission corresponding to a bullet impact on the steel target.

Figure 2:
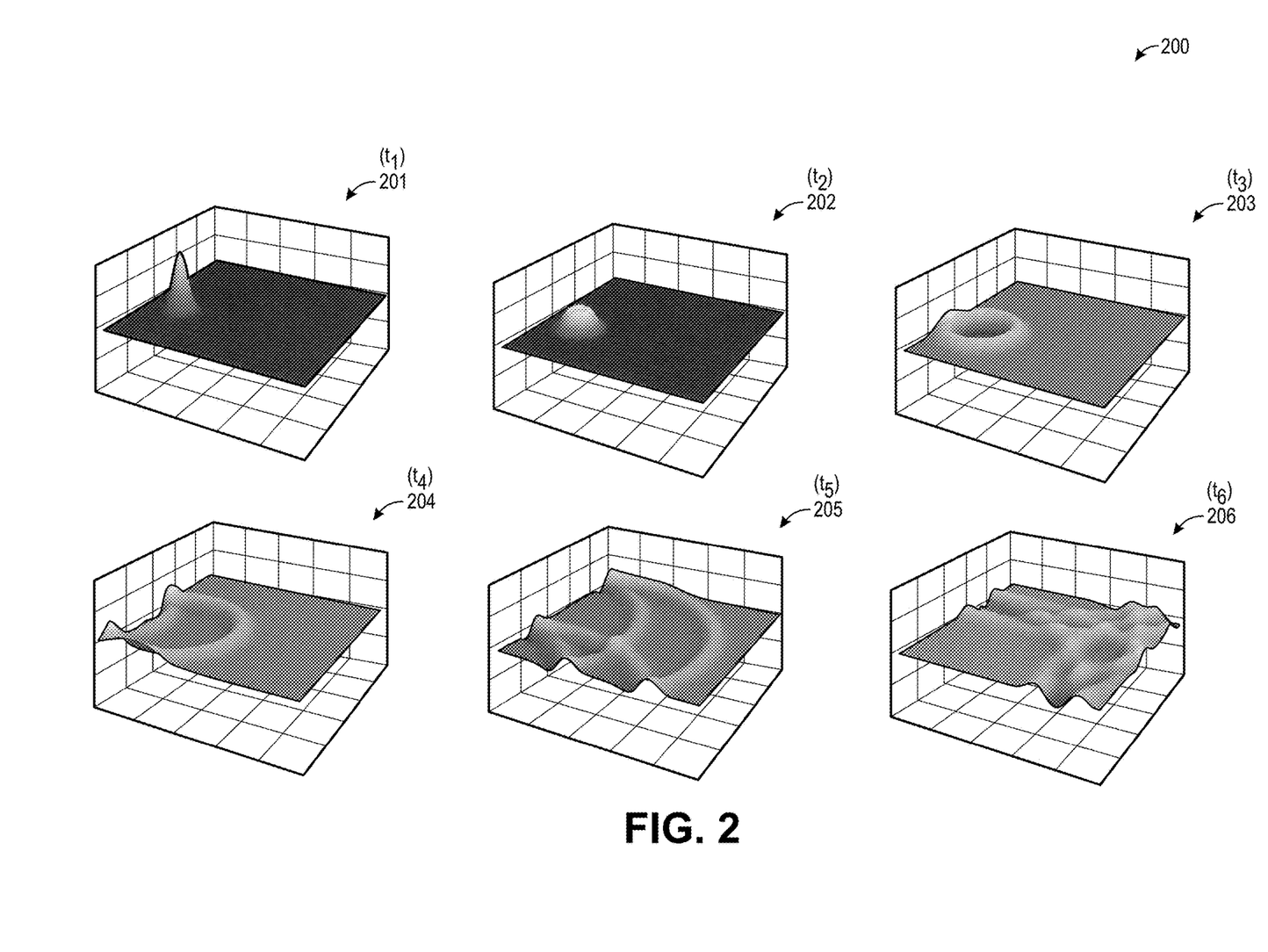
FIG. 2 depicts an example waveform progression resulting from a bullet impact on a steel target.

FIG. 2 depicts an example waveform progression 200 resulting from a bullet impact on a steel target. At time $t_1$ a bullet impact can cause waveform 201 at a steel target. Later waveform 201 can transition to waveform 202 at time $t_2$. Later waveform 202 can transition to waveform 203 at time $t_3$. Later waveform 203 can transition to waveform 204 at time $t_4$. Later waveform 204 can transition to waveform 205 at time $t_5$. Later waveform 205 can transition to waveform 206 at time $t_5$. The change in waveforms over time can be detected by transducer pairs and/or sensor points. Based on the locations of the transducer pairs and/or sensor points on the steel target, the location of the bullet impact on the steel target can be derived.

One concept of incident energy transmission is seen in audio systems where sound engineers take extensive measures to "impedance match" amplifiers, speakers and the interconnecting cables (wires). If audio systems are not properly matched, some of the sound energy is reflected, refracted and/or absorbed as it travels from the amplifier to the cable, and from the cable to the speaker, which manifests itself as audio feedback and distortion. Quality audio equipment has impedance ratings marked to aid the impedance matching process.

Accordingly, aspects of invention including "smart targets" can utilize algorithms based on wave propagation analysis to compute impact and impact location, as well as the power factor of the bullet to determine caliber and load.

In one aspect, a smart target utilizes at least three stress wave sensors to determine particle displacement at each of three known points on the target, thereby enabling the system to compute the location of the impact of a bullet on that target. The relationship between stress, strain, and displacement, and thus the location of an impact that induces stress and strain, can be modeled by a 3D elastic wave equation.

Figure 3:
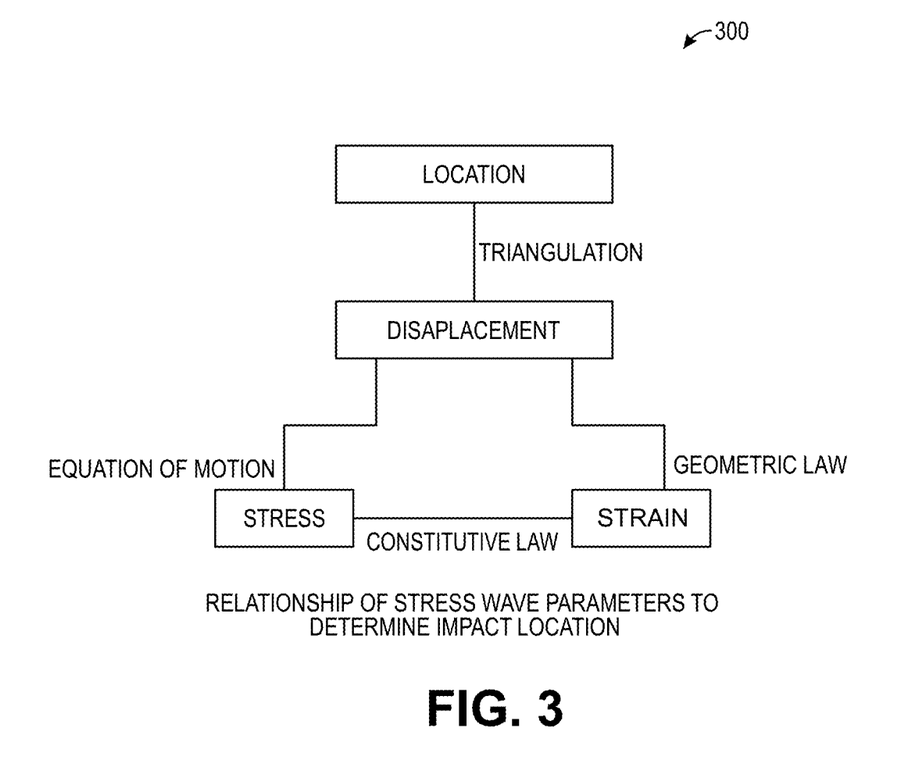
FIG. 3 depicts relationships between stress, strain, displacement, and location.

FIG. 3 depicts relationships 300 between stress, strain, displacement, and location.

Displacement

Figure 4:
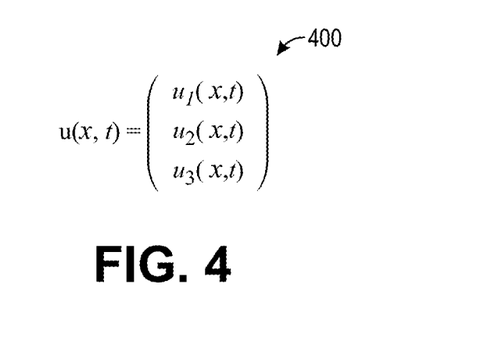
FIG. 4 depicts an example equation for calculating displacement.

Displacement (u), which characterizes vibration, is the distance of a particle from its position of equilibrium, resulting from tensors (x). FIG. 4 depicts an example equation 400 for calculating displacement. Displacement associated with bullet impact on a steel target can be computed according to equation 400.

Stress

Figure 5:
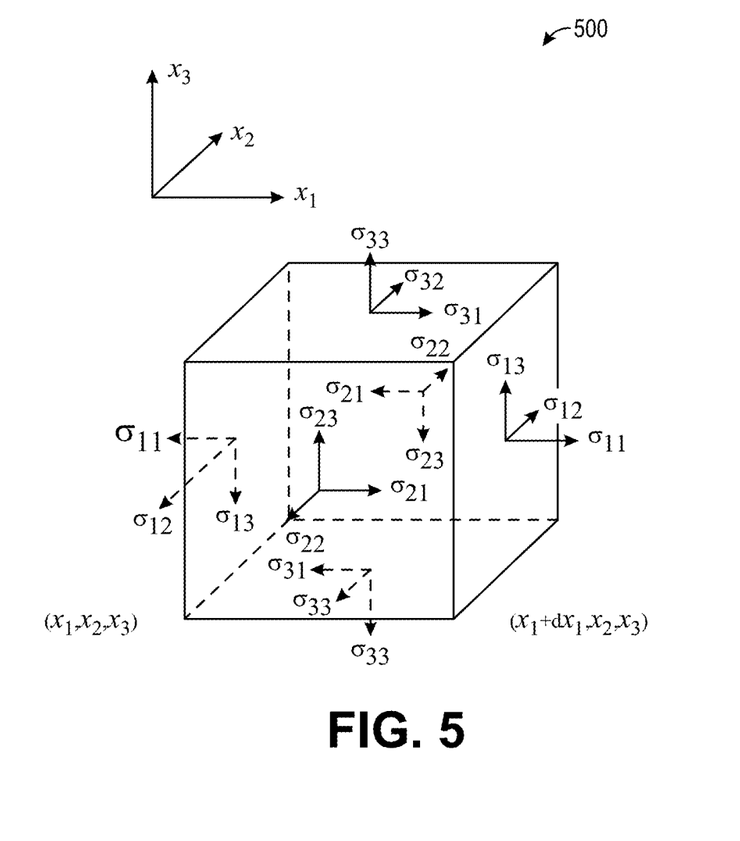
FIG. 5 depicts an example of applied forces and directions.
Figure 6:
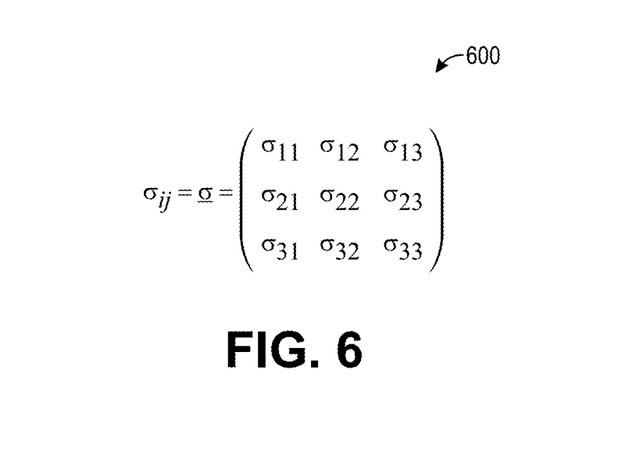
FIG. 6 depicts an example equation for calculating stress.

Stress is a measure of forces applied to material, which is a tensor. FIG. 5 depicts an example of applied forces and directions 500. Subscripts associated with the applied forces and directions indicate the application surface and associated direction. FIG. 6 depicts an example equation 600 for calculating stress. Based on the applied forces and directions 500, steel target stress associated with a bullet impact can be computed according to equation 600

Strain

Figure 7:
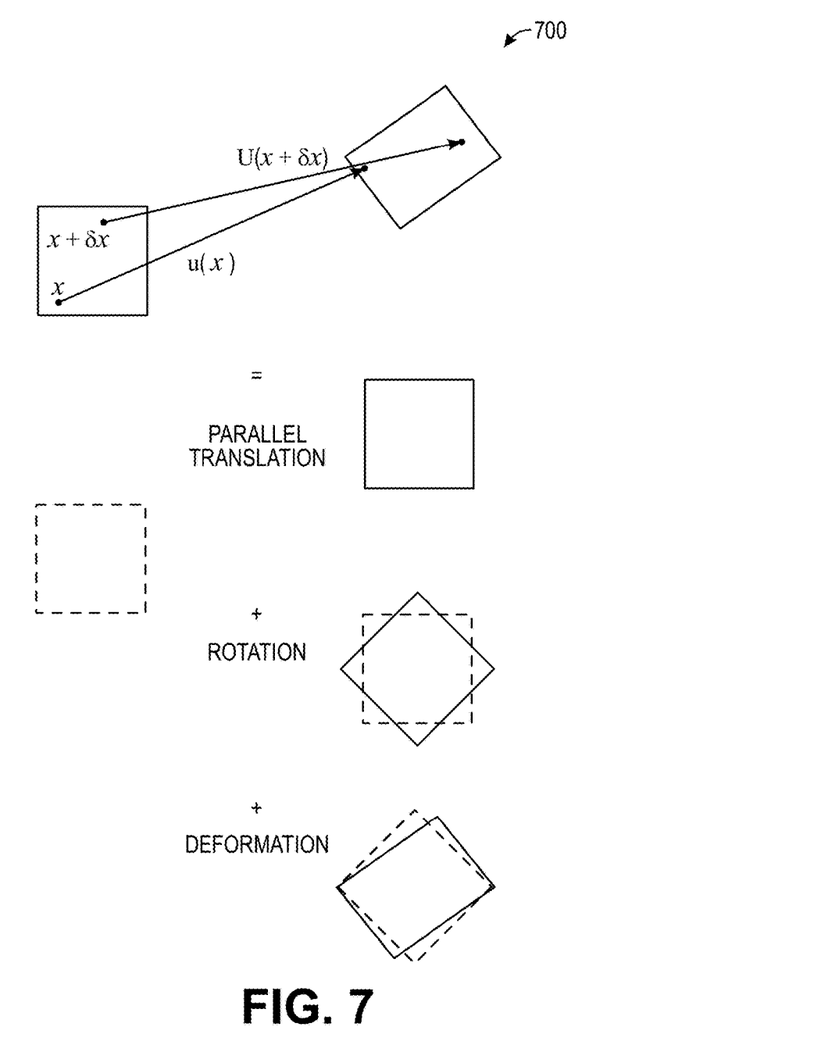
FIG. 7 depicts an example of components contributing to strain.
Figure 8:
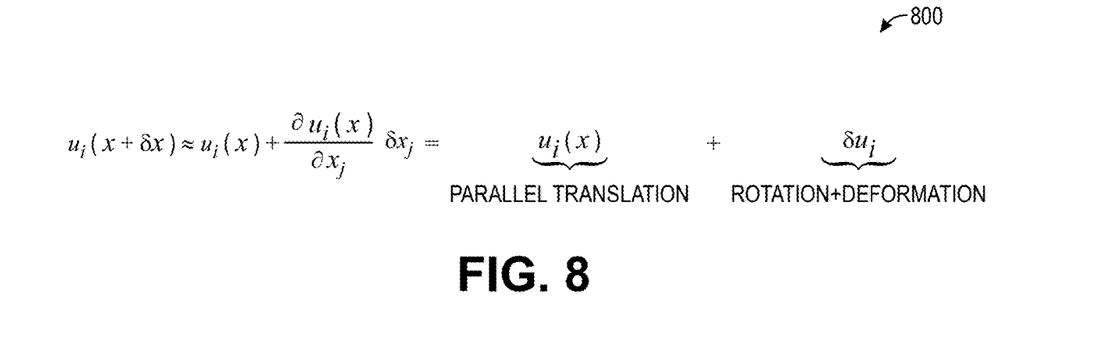
FIG. 8 depicts an example equation for calculating strain.

Strain characterizes deformations of material under stress. That is, points within the material move with respect to one another resulting in deformation. FIG. 7 depicts an example of components 700 contributing to strain. FIG. 8 depicts an example equation 800 for calculating strain. In general, a material which moves u(x) wherein the original location of the material is x, and the displacement of a nearby point originally at x+dx can be written as depicted in equation 800. Based on components 700, steel target strain associated with a bullet impact can be computed according to equation 800.

Geometric Law

Figure 9:
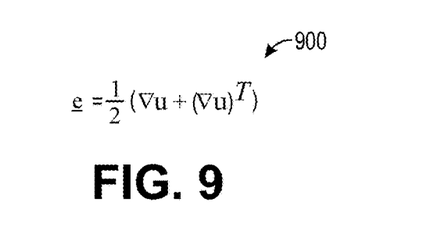
FIG. 9 depicts an example equation representing geometric law.

Geometric law describes the relationship between displacement and strain (e.g., as depicted in relationships 300), representing geometric properties (deformation). FIG. 9 depicts an example equation 900 representing geometric law. Equation 900 can be utilized when deriving a bullet impact location on a steel target.

Equation of Motion

Figure 10:
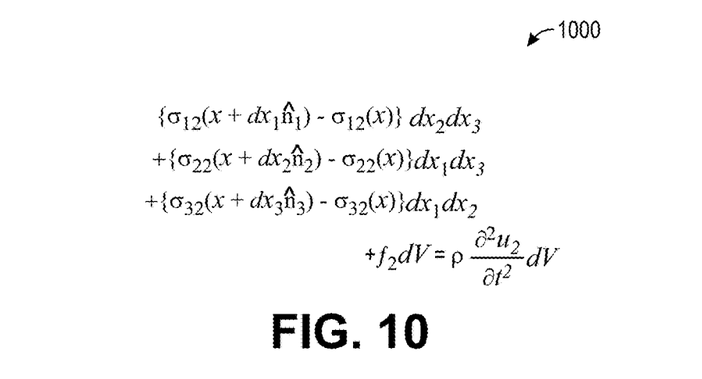
FIG. 10 depicts an example equation of motion.

The relationship between displacement and stress represents dynamic motion. FIG. 10 depicts an example equation of motion 1000. Equation 1000 can be utilized when deriving a bullet impact location on a steel target.

Constitutive Equations

Figure 11:
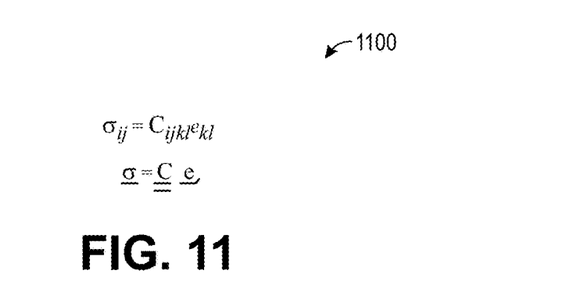
FIG. 11 depicts an example equation representing the relationship between stress and strain.

Relationship between stress and strain, which represents material properties (strength, stiffness, etc.). Given a steel target is constructed from homogeneous material (steel), there is a linear relationship between stress and strain (linear elastic). Linear elasticity is valid for the relatively short time scale involved in the propagation of stress waves. FIG. 11 depicts an example equation 1100 (based on Hooke's law) representing the relationship between stress and strain. In equation 1100, constant Cijkl is the elastic moduli, which describes the properties of the material. Equation 1100 can be utilized when deriving a bullet impact location on a steel target.

Triangulation

Figure 12:
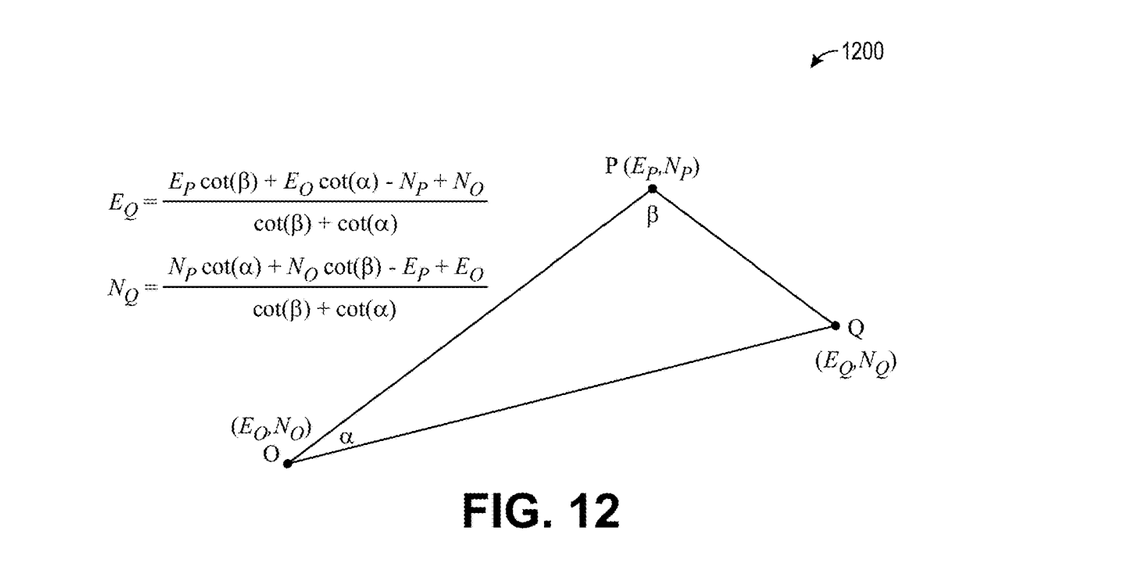
FIG. 12 depicts an example triangulation equation.

Knowing the original position of three points on the steel target and the resulting position of those three points immediately following a bullet impact, the impact or epicenter can be determined. FIG. 12 depicts an example triangulation equation 1200. Equation 1200 can be utilized when deriving a bullet impact location on a steel target.

Example Targets

Figure 13:
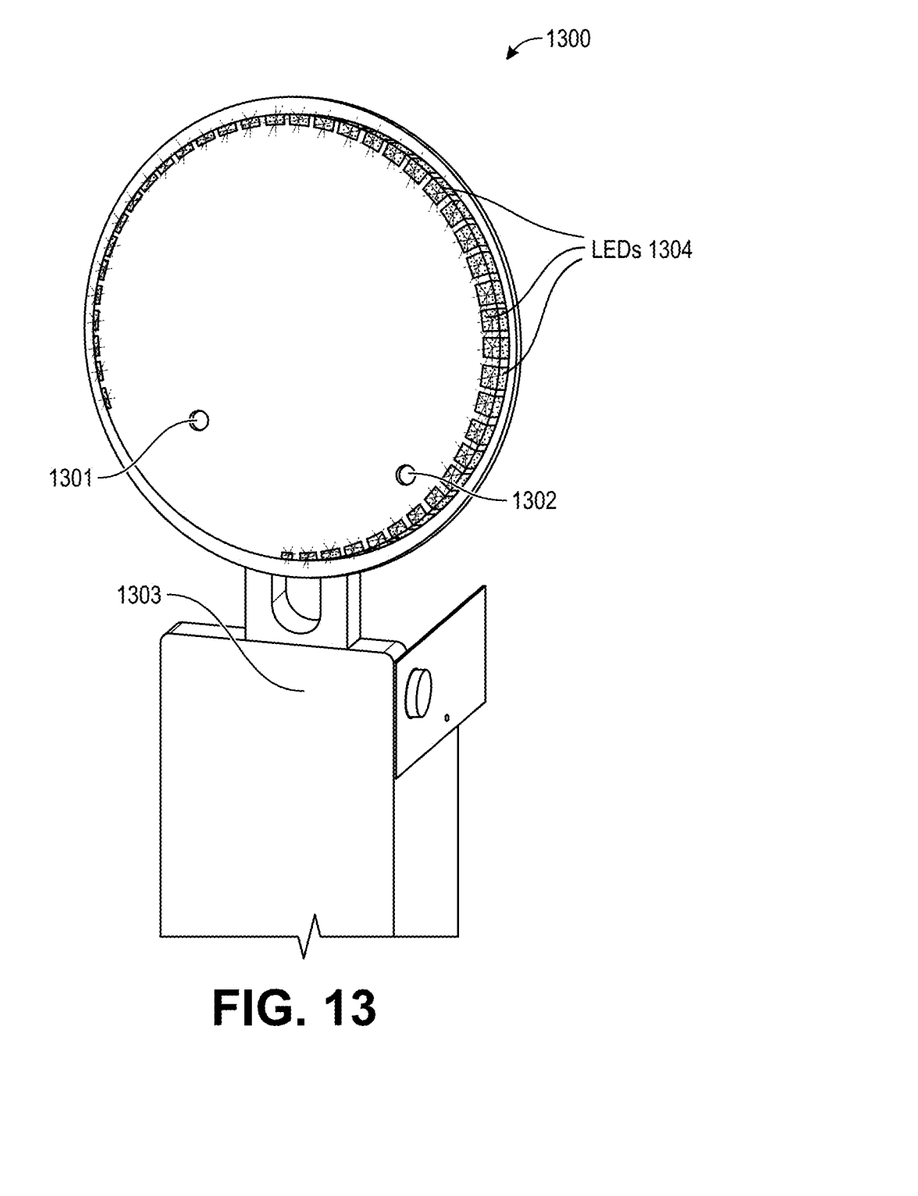
FIG. 13 depicts an example target.

FIG. 13 depicts an example target 1300. As depicted, target 1300 includes hit detecting ballistic surface 1301, integrated LED lighting 1302, up/down articulator 1303, and edge LEDS 1304. Detecting bullet impacts can be facilitated by one or more transducer pairs and/or sensor points joined to selected locations on the back of hit detecting ballistic surface 1301. Any connected transducer pairs and/or sensor points can be connected to an impact detector (e.g., impact detector 114). The transducer pairs and/or sensor points can send sensor output to the impact detector. The impact detector can implement any of the described equations to derived an impact location on hit detecting ballistic surface 1301. The impact detector can indicate the detected location to a zone controller (e.g., zone controller 101) or other processing system.

Figure 14:
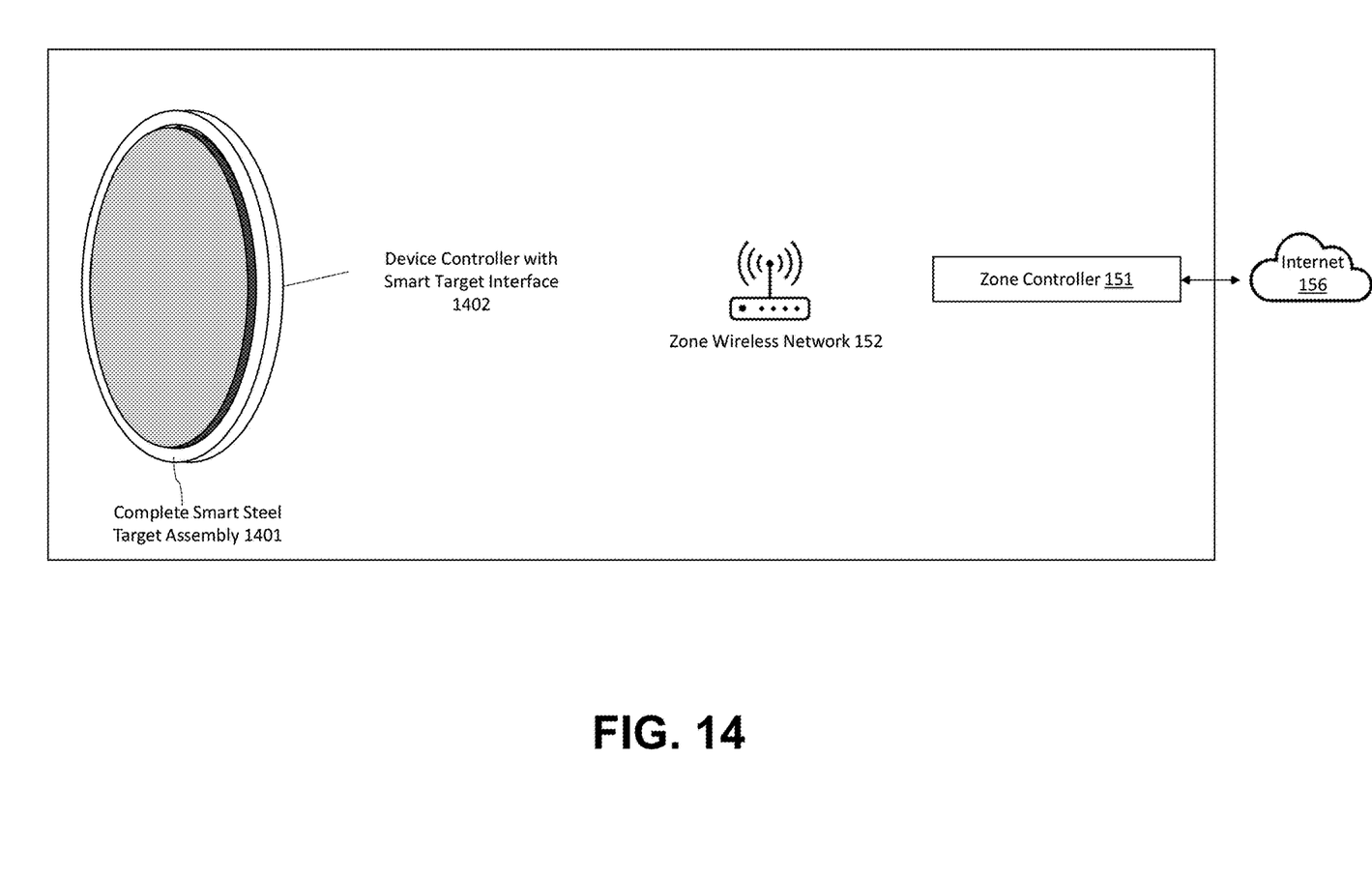
FIG. 14 depicts an example target assembly.

FIG. 14 depicts an example complete smart steel target assembly 1401. Complete smart steel target assembly 1401 can include device controller with smart target interface 1402. Complete smart steel target assembly 1401 can be used to implement one or more of target 113, target 166A, target 166B, or target 166C. Device controller with smart target interface 1402 can communicate with zone controller 151 via zone wireless network 152. Zone controller 151 can send instructions (or a sequence of instructions) over zone wireless network 152 to device controller with smart target interface 1402 (e.g., in combination with sending instructions to controllers at other targets and/or actuators/articulators) to facilitate different shooting scenarios, sequences, timings, etc. or portions thereof.

Figure 15:
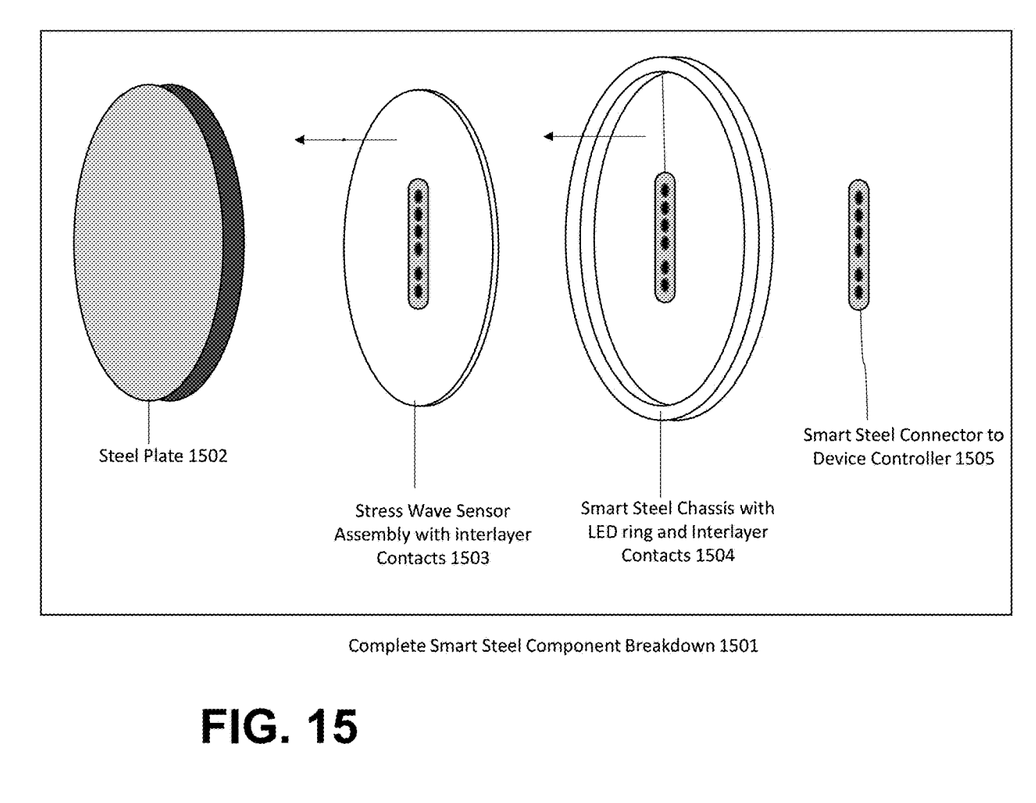
FIG. 15 depicts an example component breakdown of a target assembly.

FIG. 15 depicts an example component breakdown 1501 of complete smart steel target assembly 1401. As depicted, component breakdown 1501 of complete smart steel target assembly 1401 includes steel plate 1502 (e.g., an AR500 steel plate), stress wave sensor assembly with interlayer contacts 1503, smart steel chassis with LED ring and interlayer contacts 1504, and smart steel connector to device controller 1505.

Other Aspects

Aspects facilitate more advanced control, presentation and illumination of steel targets in a shooting range, including:

- An apparatus that raises and lowers a steel plate in a variety of distances (e.g., the target can be raised 1 inch or many inches).
- A system that transitions a target between fixed and hinged positions.
- A system that provides closed-loop feedback on its position, mode (fixed or hinged) and state (upright or knocked over).
- A system that allows a target to be fixed for one or more bullet impacts and hinged after said number of bullet impacts. For example, the shooting drill or game may be to hit a target 3 times, so the target would be fixed until the second bullet impact occurred and then hinged thereafter so the third bullet impact knocks over the target on its hinge.
- Coating on a steel plate target that provides for a 1+ or higher reflective gain to enable external lighting or projectors to "paint" shapes, numbers, patterns and other graphics on steel targets with high visibility.

Aspects further facilitate automated shot detection in a multi-user environment in a shooting range, including:

- Detecting a discharge of a firearm using a plurality of sensors including mic and accelerometer.
- Ability to associate the said wearable with a specific user ID within a shooting training, scoring and gaming system.
- The ability to dynamically assign a scoring band to a specific user ID.
- The use of a higher-precision time event system that enables computation of time-of-flight of the bullet after discharge detection.
- Aspects of the invention can also artificial intelligence for real-time shooter feedback and training, and network-connected eye and ear protection.

As described, LED lights can be embedded in and/or attached to the rim of a steel target to provide visual cues and/or feedback to shooters. For example, LEDs can be positioned around the edge of target 1300. LEDs can display various visual effects including illumination, de-illumination, flashing, pulsing, theater-style chases, scanning, or other lighting effects in a variety of different colors, for example, in response to bullet impacts. LEDs can also display any of the described visual effects in response to a received signal (e.g., from zone controller 110). The visual effects can be changed in response to bullet impact.

Additional aspects include: (a) Integrated, intelligent personal hearing and eye production in a shooting environment, (b) use of Artificial Intelligence and Machine Learning for automated scoring and personalized training in a shooting range, (c) use of high-speed cameras and Artificial Intelligence to detect target misses in a shooting range.

In one aspect, a system (which may be referred to as "Smart Steel") determines and displays a bullet impact on a steel target (e.g., steel target 113, any of targets 166A, 166B, or 166C, target 1300, or complete smart steel target assembly 1401). The system includes a plurality of sensors conjoined with said steel target and including at least one strain gauge for measuring data including strain on a target. A set of LED lights is conjoined with said steel target for displaying bullet impacts. The system includes a wireless transmitter adapted to transmit target impact data. The wireless transmitter is conjoined with or otherwise communicably connected to the plurality of sensors. The system includes at least one remotely located wireless receiver for receiving transmitted target impact data.

Accordingly, implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

Components in architecture 100 can be connected to (or be part of) a network, such as, for example, a system bus, a Local Area Network ("LAN"), a Wide Area Network ("WAN"), and even the Internet. Accordingly, computer systems, mobile phones, projectors, (articulator) controllers, articulators, steel targets, impact detectors, wireless relays, wearable shot detectors, zone controllers, smart hearing protectors, smart safety glasses, cameras, websites, live scoring displays, management consoles, etc. as well as components thereof and any other connected computer systems and their components can create and exchange data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A system comprising:
    a steel target including a shooter presentation side and a back side;
    a plurality of sensors including at least one strain gauge attached to the back side of the steel target;
    a set of LED lights attached to the shooter presentation side of the steel target configured to indicate bullet impact; and
    a wireless transmitter attached to the back side of the steel target, connected to the plurality of sensors, and configured to transmit impact data measured by the plurality of sensors.

2. The system of claim 1, wherein a plurality of sensors including at least one strain gauge comprises the plurality of sensors including at least one electrical resistance-type strain gauge.

3. The system of claim 1, wherein the wireless transmitter is further configured transmit information identifying one or more of: target type, target size, target shape, number of LEDs included in the plurality of LEDs, or articulating capabilities of the steel target.

4. The system of claim 1, wherein the wireless transmitted is further configured as multiplex combining data from the plurality of sensors into one transmission signal.

5. The system of claim 1, further comprising a bullet resistance cover covering the plurality of sensors.

6. The system of claim 1, wherein the plurality of sensors includes three transducer pairs spaced at known distances from one another on the back side of the steel target, each transducer pair including a strain gauge and an accelerometer.

7. The system of claim 6, wherein each transducer pair including a strain gauge and accelerometer comprises each transducer pair including an electrical resistance-type strain gauge and a MEMS, charge-coupled accelerometer.

8. The system of claim 1, wherein plurality of sensors is configured to measure the impact data associated with stress waves propagating through the steel target incident to bullet impact.

9. The system of claim 1, wherein the set of LED lights includes a plurality of LED lights around the edge of steel target.

10. The system of claim 1, wherein a set of LED lights attached to the shooter presentation side of the steel target configured to indicate bullet impact comprises the set of LED lights configure to perform a lighting effect from among: illumination, de-illumination, blinking, flashing, pulsing, or scanning to indicate bullet impact.

11. The system of claim 10, wherein the set of LED lights configured to perform a lighting effect from among: illumination, de-illumination, blinking, flashing, pulsing, or scanning to indicate bullet impact comprises changing from a different lighting effect to perform the lighting effect.

* * * * *